Patented Dec. 15, 1953

2,662,874

UNITED STATES PATENT OFFICE 2,662,874

PREPARATION OF PLASTIC CONDENSABLE SYNTHETIC RUBBERS AND SUBSEQUENT ELASTO-CONDENSATION THEREOF

Harold P. Brown, Akron, Ohio, assignor to The B. F. Goodrich Company, New York, N. Y., a corporation of New York No Drawing. Application November 1, 1950, Serial No. 193,522

14 Claims. (Cl. 260—79.5)

1

The present invention relates generally to the preparation of plastic synthetic rubbers which are polymers of an open chain aliphatic conjugated diene and are further characterized by the ability to undergo useful condensation reactions by reason of the presence in their structure of a controlled amount of free carboxyl groups, and to the subsequent elasticization (or curing) of such plastic synthetic rubbers by a condensation reaction (termed herein "elasto-condensation") involving the free carboxyl groups.

In my copending related application, Serial No. 193,521, filed November 1, 1950, I have disclosed that elastic synthetic rubber condensation products of unusual and highly advantageous properties are secured by first preparing a plastic, rubbery polymer containing a controlled amount, from 0.001 to 0.30 chemical equivalents by weight for each 100 parts by weight of rubbery polymer, that is from 0.045 to 13.5% by weight of the rubbery polymer, of combined carboxyl (—COOH) groups, and then condensing the carboxyl-containing, plastic rubbery polymer with a polyvalent metal oxide whereby elasticization of the plastic polymer occurs by reason of a salt-forming condensation-polymerization reaction involving the carboxyl groups of the polymer and the metallic cation of the polyvalent metallic oxide, and resulting in a strongly elastic, polymeric metallo-carboxylate. The copending application particularly describes the preparation of the carboxyl-containing plastic rubbery polymer by copolymerization in aqueous medium under acidic conditions of a monomeric mixture comprising an open-chain aliphatic conjugated diene and an olefinically-unsaturated carboxylic acid.

This application is directed to another method of producing plastic carboxyl-containing, rubbery diene-type polymers admirably suited to subsequent elasto-condensation reactions. According to this method, a plastic, rubbery polymer of an open-chain aliphatic conjugated diene (the polymer itself being substantially free of combined carboxyl groups) is reacted with a carboxylating agent or carboxyl-supplying reagent, preferably in the presence of an oxidizing agent, whereby the carboxylating agent reacts with the polymer to produce a carboxylated polymer containing from 0.001 to 0.30 chemical equivalents by weight of combined carboxyl (—COOH) groups for each 100 parts by weight of polymer. The resulting carboxylated or carboxyl-containing polymer (or polymeric adduct) is still rubbery and easily worked and, unlike

2 the original polymer, undergoes elasto-condensation reactions with polyvalent metallic oxides to produce strongly elastic, polymeric metallo-carboxylates of unusual tensile strength and other properties.

By this method it is possible for rubber processors having no polymerization equipment or facilities to convert synthetic rubbers which are presently commercially available, such as polybutadiene-1,3, the copolymers of butadiene-1,3 with styrene, the copolymers of butadiene with acrylonitrile, the polymers of 2-chloro butadiene-1,3 and others, to carboxyl-containing rubbers capable of undergoing elasto-condensation, and then subsequently to convert the carboxyl-containing rubbers to strongly elastic, polymeric metallo-carboxylates. Another advantage of the method of this application resides in the fact that a mass of plastic, rubbery polymer may be carboxylated on its surface only, so that the surface can partake in elasto-condensation reactions, without necessarily altering the structure of the interior of the mass.

The plastic, rubbery materials utilizable in the carboxylation step of the method of this application are broadly classifiable as polymers of an open-chain, aliphatic conjugated diene, that is the homopolymers of the dienes, their copolymers with other copolymerizable comonomeric materials and other multi-component interpolymers containing at least 50% by weight of interpolymerized diene. These plastic, rubbery polymers are produced by the interpolymerization of a diene of the above class, with or without the presence of comonomers, under conditions adapted to produce plastic synthetic rubbery materials. The polymers are prepared by the polymerization, preferably in aqueous emulsion, of a monomeric material comprising a predominant proportion of a conjugated diene such as the butadiene-1,3 hydrocarbons including butadiene-1,3 itself, 2-methyl butadiene-1,3, 2,3-dimethyl butadiene-1,3, piperylene, 2-neopentyl butadiene-1,3 and other hydrocarbon-substituted homologs of butadiene-1,3; and in addition such substituted dienes as 2-chloro butadiene-1,3, 2-cyano butadiene-1,3, and others as well as other dienes including the straight chain pentadienes, the straight and branch-chain hexadienes and others. The monomeric mixture may contain also one or more of the above dienes either alone or in combination with a minor proportion of one or more copolymerizable materials including the mono-olefinic monomers such as vinylidene chloride, acrylonitrile, methacrylonitrile, chloroacrylonitrile, the alkyl esters and amides of acrylic and alpha-alkyl acrylic acids such as methyl acrylate, ethyl acrylate, butyl acrylate, 2-ethylhexyl acrylate, methyl methacrylate, methyl ethacrylate, butyl methacrylate, lauryl methacrylate, N,N'-dimethyl acrylamide, and others; vinyl substituted cyclic compounds such as styrene, vinyl naphthalene, vinyl pyridine and others, and in addition such monomers as p-divinyl benzene, diallyl maleate, isobutylene and others. The polymers found particularly useful for the production of carboxylated polymers range from the homopolymers of the dienes such as polybutadiene, polyisoprene and the like to polymers produced from monomeric mixtures comprising from 50 to 99% by weight of a diene and from 1 to 50% by weight of one or more of the above comonomers.

The carboxylating agents useful in the production of the carboxyl-containing polymeric adducts are chemicals containing a carboxyl group or the anhydride thereof characterized by their ability to react with the diene polymer molecules by an addition to the olefinic double bonds or by a substitution reaction involving a reactive center such as a halogen atom or the like. For example, maleic acid (and similarly maleic anhydride) reacts with a diene polymer, probably by addition across the olefinic double bonds forming a four carbon ring structure, thereby to produce a plastic, workable carboxyl-containing polymer. Illustrative carboxylating agents similar in their reactivity to maleic acid include maleic anhydride, dimethyl maleic acid, the anhydride of dimethyl maleic acid, and others. Acrylic acid, methacrylic acid, and other alpha-beta unsaturated carboxylic acids are also carboxylating agents which react with the polymer to produce carboxyl-containing polymers.

Mercapto-substituted carboxylic acids and their anhydrides constitute another class of carboxylating agents. They are characterized by possessing at least one mercapto (—SH) substituent and at least one carboxyl (—COOH) group and by their ability to react with a diene polymer through the addition of the mercapto-sulfur to the olefinic double bonds of the polymer with the production of plastic, rubbery carboxyl-containing polymer. Illustrative mercapto- and carboxylating agents include the mercapto-substituted carboxylic acids such as thioglycollic acid (mercapto acetic acid), beta-mercapto propionic acid, beta-mercapto acrylic acid, 4-mercapto butyric acid, 3-mercapto butyric acid, 3-mercapto crotonic acid, 4-mercapto-3-butenoic acid, 5-mercapto valeric acid, 4-mercapto valeric acid, 6-mercapto caproic acid, 3-mercapto hydrosorbic acid, 2-mercapto succinic acid, omega-mercapto undecylenic acid, thiosalicyclic acid (ortho-mercapto benzoic acid), 2-mercapto-1-naphthoic acid, 2-mercapto cyclohexanecarboxylic acid, and others and the mercapto-substituted carboxylic acid anhydrides such as the anhydride of acetic acid with thioglycollic acid, bis-(thioglycollic) anhydride, bis-(beta-mercapto propionic) anhydride, the anhydride of acetic acid with beta-mercapto propionic acid, bis-(4-mercapto butyric) anhydride, bis-(5-mercapto valeric) anhydride, bis-(2-mercapto succinic) anhydride, bis-(5-mercapto adipic) anhydride, 3-mercapto phthalic anhydride, 3,5-dimercapto phthalic anhydride, 3-mercapto-5-chlorophthalic anhydride, 3-mercapto tetrahydrophthalic anhydride, 4,5-dimercapto naphthalic anhydride, bis-(alpha-mercapto-beta-phenyl acrylic) anhydride (a mercapto-substituted cinnamic anhydride), and others.

Other carboxylating agents which function through reaction with a reactive center on the diene polymer molecule include, for example, alkali-metal or alkaline-earth mono-salts of dicarboxylic acids such as monosodium or monopotassium oxalate, monosodium succinate, monosodium adipate, monosodium pimelate and others, which react with chlorine atoms on, for example, a 2-chloro butadiene-1,3 molecule splitting out NaCl and forming a

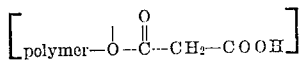

grouping which is reactive through the carboxyl group in an elasto-condensation with the formation of a polymeric metallo-carboxylate. These and other materials are termed "carboxylating agents" because they introduce a carboxyl group into a polymer molecule.

The preferred carboxylating agents are thioglycollic acid, beta-mercapto propionic acid, thiosalicyclic acid, maleic acid and maleic anhydride and acrylic acid because of their ready availability, low cost, and their compatibility and reactivity with synthetic rubbery materials.

The peroxygen catalyst required for efficient reaction of the carboxylating agent with the polymer may be any of the organic peroxides such as benzoyl peroxide (preferred), o,o'-dichlorobenzoyl peroxide, caproyl peroxide, caprylyl peroxide, pelargonyl peroxide, cumene hydroperoxide, tertiary butyl hydroperoxide, 1-hydroxycyclohexyl hydroperoxide, tertiary butyl diperphthalate, tertiary butyl perbenzoate, and the inorganic peroxygen compounds such as potassium persulfate, sodium perborate and the like, and others. Benzoyl peroxide because of its low cost, compatibility with rubbery materials and activity is the preferred addition catalyst.

The reaction between the carboxylating agent and the plastic diene-type synthetic rubbery material may be carried out in several different ways. The reaction may be carried out by the addition of the carboxylating agent and the peroxygen catalyst to a solution or aqueous dispersion of rubber followed by mildly heating the reaction mixture until sufficient reaction has occurred. Reaction in solution at temperatures of from 25° to 150° C. will usually be complete in from 2 to 24 hours.

An alternative and preferred method of carrying out the addition reaction is to add the addition agent and catalyst to the solid rubber during mastication of the rubber on a cool two-roll rubber mill, the rolls of which are closely spaced. According to this preferred method the plastic synthetic rubber is placed on the mill and broken down until a smooth plastic band is formed. The carboxylating agent such as thioglycollic acid, beta-mercapto propionic acid, maleic anhydride or the like, and the peroxygen catalyst are then added in any order, but preferably the carboxylating agent is added first followed by the addition of the catalyst. The milling on the cool tight mill is continued until a homogeneous composition has been obtained. Since the carboxylating agents and peroxygen catalysts, particularly the organic peroxides, are compatible with synthetic rubbery materials the addition of the reaction ingredients is readily accomplished. Reaction to all intents and purposes is complete during a milling cycle of, for example, 5 to 30 minutes or more. If it is desired to raise the reaction temperature the mill rolls may be supplied with a heating medium at the correct temperature. However, since synthetic rubbery materials are readily degraded in the presence of a peroxygen catalyst it is preferred that the temperature of the rubber not exceed 150° C. during milling.

The amount of carboxylating agent will vary somewhat according to the amount of carboxyl (—COOH) desired in the carboxylated rubber. When the carboxylation is performed by masticating the mixture of the rubbery diene polymer and carboxylating agent, all of the carboxylating agent remains in the rubber and the unreacted portion, if any, is difficult to determine. In solution carboxylation the product is generally recovered by precipitation so that the precipitate is essentially free of unreacted carboxylating agent and generally contains less than theoretical amounts of carboxyl. For these reasons it is generally desirable to utilize amounts of carboxylating agent at least chemically equivalent to, and preferably from 1½ to 3 times, the carboxyl content desired in the product. When thioglycollic acid is the carboxylating agent this means that from 0.001 to 0.30 moles per 100 parts by weight of polymer or from about 1 part to about 83 parts by weight per 100 parts of rubbery diene polymer will be utilized. In general, from about 2 to about 40 parts by weight per 100 parts of rubbery polymer of a carboxylating agent will be found sufficient.

The amount of peroxygen compound used, if any, as a carboxylating catalyst is not critical and may be varied somewhat. Amounts of a peroxygen compound such as benzoyl peroxide, for example, varying from as little as 0.5 to 1.0 part per 100 parts by weight of rubbery polymer (p. h. r.) to as much as 10 or 15 p. h. r. may be utilized. In general it is desirable because of the tendency of the peroxygen compounds to degrade the rubbery diene polymers to utilize the lesser amounts of peroxygen compound, preferably from about 1.0 to about 10 p. h. r.

Conversion of the plastic, carboxyl-containing polymeric adduct to an essentially elastic condition is brought about by reaction with a polyvalent metallic oxide such as those of zinc (preferred), magnesium, calcium, cadmium, titanium, aluminum, barium, strontium, copper (ic), cobalt, tin, iron, lead and others followed by heating the resulting composition. Specifically, zinc oxide, calcium oxide, cadmium oxide (CdO), magnesium hydroxide, dibutyl tin oxide, tin oxide (SnO), lead oxide (PbO), barium oxide, cobalt oxide ($Co_2O_3$), strontium oxide (SrO), and others produce superior results and are preferred. In addition, polyvalent metallic hydroxides (which in reality are hydrated polyvalent metallic oxides and readily give up water upon heating or upon reaction with polymer carboxyl groups) such as zinc hydroxide, calcium hydroxide, cadmium hydroxide, barium hydroxide, aluminum hydroxide, and others also produce polymeric metallo-carboxylates of high strength and other excellent properties and accordingly are very useful curing or elasto-condensing agents.

The amount of polyvalent metallic oxide curing or elasticizing agent necessary for efficient elasticization will vary somewhat depending on the carboxyl content of the rubbery material, on the metallic oxide itself and on its state of division and compatibility with the rubbery material. While as little as one part by weight of a metallic oxide such as zinc oxide per 100 parts by weight of rubbery material will effect a detectable degree of cure of one of the polymeric adducts of this invention, it has been found that an empirical relationship exists between the carboxyl content of the polymeric adduct and the amount of metallic oxide employed. It has been found necessary to employ an amount of metallic oxide chemically equivalent to at least one-half the carboxyl groups of the polymer. Use of increased amounts of polyvalent metallic oxide induces corresponding improvements in the properties of the polymeric metallo-carboxylates. For the latter reason it is preferred to utilize amounts of metallic oxide of twice or more the amount chemically equivalent to the carboxyl content of the polymer.

The admixture of the carboxyl-containing polymeric adduct with the polyvalent metallic oxide is ordinarily carried out by mastication of the solid polymeric-adduct as on a rubber mill, internal mixer, Banbury, etc. However, the metallic oxide may be dispersed in water and added to an aqueous dispersion of the carboxyl-containing polymer adduct and the resulting composite dispersion used for coating, dipping or impregnation and the like. The reaction between the metallic cation of the metallic oxide and the (—COOH) groups of the adduct is fairly vigorous compared to the sulfur vulcanization reaction in ordinary rubbers. In fact, some "cure" is obtained upon long standing at room temperatures but heating to elevated temperatures is ordinarily necessary to insure completion of the reaction in a reasonable time and obtainment of optimum properties. Temperatures of from 125 to 400° F., more preferably 150 to 350° F., will usually be found to achieve efficient cure or elasto-condensation in from 5 minutes to two hours or more.

The invention will now be described with reference to certain specific examples which shall describe in detail the practice of the method of this invention. The examples are intended to be merely illustrative of the invention and not as limitations on the scope thereof.

EXAMPLE 1

A polybutadiene-1,3 synthetic rubber is prepared by polymerization at 50° C. of butadiene-1,3 in an acidic aqueous emulsion having the following composition:

| Materials | Parts/Wt. |
| --- | --- |
| Butadiene-1,3 | 100.0 |
| Water | 200.0 |
| Dodecylamine | 5.0 |
| HCl (To neutralize 90% of amine) | |
| t-dodecyl mercaptan | 0.4 |
| Potassium persulfate | 0.2 |
| Aluminum Chloride | 0.2 |

The polymerization is conducted until 73% of the butadiene-1,3 has polymerized. The product is a polymer completely soluble in benzene. The reaction is terminated by the addition of 0.1% by weight of hydroquinone based on the polymer and the polymer is stabilized by the addition of 1.5% by weight of phenyl-beta-naphthylamine. Thirty grams of the polybutadiene rubber thus obtained are dissolved in 500 cc. of benzene. To the resulting polymer solution there are added 1.5 grams of benzoyl peroxide and 9.2 grams of thioglycollic acid and the reaction vessel flushed with nitrogen and sealed. The contents of the vessel are warmed to 50° C. and agitated at that temperature for 24 hours. The polymeric adduct is recovered by evaporation of the benzene, washing the solid polymer twice with ethyl alcohol containing 3% by weight of dissolved phenyl-beta-naphthylamine and drying at 55° C. The polybutadiene-thioglycollic adduct is analyzed for carboxyl content by titrating a 1% solution of the adduct in benzene with standardized alcoholic KOH to a phenolphthalein end-point. It is found to contain 0.07 e.p.h.r. of (—COOH). Sulfur analysis of the adduct confirms the introduction of the latter amount of (—COOH).

The polybutadiene-thioglycollic adduct is mixed with 10 p.h.r. of zinc oxide and press-molded at 33,000 lbs./sq. in. for 40 minutes at 300° F. The product is found to be a strongly elastic, clear gum composition having a tensile strength of 1120 lbs./sq. in., a 300% modulus of 620 lbs./sq. in., and an ultimate elongation of 445%. The original polybutadiene when similarly treated with zinc oxide shows no sign of cure or elasticization. The polybutadiene adduct containing no zinc oxide also shows no sign of cure when similarly heated.

EXAMPLE 2

The polybutadiene-1,3 synthetic rubber of Example 1 is reacted with beta-mercapto propionic acid by dissolving 60 grams of the rubber in 600 cc. of benzene, adding 2.9 grams of benzoyl peroxide and 19.08 grams of beta-mercapto propionic acid to the resulting solution, and heating for 24 hours at 50° C. The product is found to contain 0.068 e.p.h.r. of (—COOH). Zinc oxide 10 p.h.r. is milled into the polybutadiene beta-mercapto propionic acid adduct and the resulting plastic composition heated in a mold for 80 minutes at 300° F. The product is a strong elastic pure gum composition.

EXAMPLE 3

To a solution of 30 grams of the polybutadiene synthetic rubber described in Example 1 dissolved in 500 cc. of benzene there are added 12.1 grams of benzoyl peroxide and 9.8 grams of maleic anhydride. The reaction vessel is swept out with nitrogen, sealed and placed in a constant temperature bath at 50° C. and the contents agitated for three days. The product, when isolated as before and admixed with 10 p.h.r. of zinc oxide and press-molded for 80 minutes at 300° F. is converted to a strongly elastic, polymeric metallo-carboxylate.

EXAMPLE 4

60 grams of a copolymer produced by the emulsion polymerization of 55 parts by weight of butadiene-1,3 and 45 parts acrylonitrile (known commercially as "Hycar OR–15") is dissolved in 600 cc. of benzene. To the resulting solution 2.9 grams of benzoyl peroxide and 19.08 grams of beta-mercapto propionic acid are added. The reaction mixture is agitated at 50° C. for 24 hours to produce a product containing 0.119 e.p.h.r. of (—COOH). Upon being admixed with 10 p.h.r. of zinc oxide and heated for 40 minutes at 300° F., an elastic, nearly translucent polymeric metallo-carboxylate is produced having a tensile strength of 1270 lbs./sq. in. and an elongation of 620%.

EXAMPLE 5

In a similar manner, 500 cc. of the 10% solution of the copolymer described in Example 4 is treated with 6 grams of benzoyl peroxide and 19.6 grams of maleic anhydride. The raw adduct, which contains 0.028 e.p.h.r. of carboxyl (—COOH), when admixed with 10 p.h.r. of zinc oxide and heated 80 minutes at 300° F. produces a strong elastic composition.

EXAMPLE 6

Polymeric adducts similar to those described in Examples 1 to 5 may be prepared by masticating a mixture of the olefinically-polyunsaturated rubber, a carboxylating agent, and a peroxide-type catalyst. For example, the butadiene acrylonitrile copolymer described in Example 4 is placed on a two-roll rubber mill, the rolls of which are cooled and closely spaced so as to exert a vigorous masticating action, and milled until a smooth band is formed. To the rubber on the mill there are added 11.7 p.h.r. of beta-mercapto propionic acid and 4.84 p.h.r. of benzoyl peroxide. Milling is continued until a smooth homogeneous composition is obtained. The temperature obtaining during mastication varied from 70° F. to 150° F. The resulting composition is then press-molded for 40 minutes at 326° F. The resulting elastic composition is found to exhibit a tensile strength of 2380 lbs./sq. in., a modulus of 1310 lbs./sq. in. and an elongation of 420%. In a similar fashion, mastication of the butadiene acrylonitrile copolymer rubber with bis(thioglycollic) anhydride produces a material which when cured with zinc oxide is converted to a strong elastic composition remarkably stable to heat.

EXAMPLE 7

A standard butadiene styrene copolymer prepared by polymerization in aqueous emulsion of a mixture consisting of 71.5 parts by weight of butadiene-1,3 and 28.5 parts by weight of styrene and known commercially as "GRS-X 506" is masticated on a rubber mill as in Example 6 with 4.84 p.h.r. of benzoyl peroxide and 10 p.h.r. of thioglycollic acid. The resultant plastic composition is admixed with 10 p.h.r. of zinc oxide and heated in a mold for 20 minutes at 326° F. The resultant elastic composition exhibits a tensile strength of 2100 lbs./sq. in., a modulus of 1340 lbs./sq. in. and an elongation of 370%.

In a similar fashion, a copolymer of isobutylene and isoprene known as "GR-I" masticated with maleic anhydride produces a material which upon being cured with zinc oxide is converted to a strong elastic composition having better properties than sulfur cured "Butyl" rubbers.

EXAMPLE 8

Substitution for the zinc oxide utilized in the previous examples of equivalent amounts of calcium oxide, calcium hydroxide, cadmium oxide, cadmium hydroxide, magnesium oxide and other polyvalent metallic oxides produces substantially equivalent results, the calcium and cadmium oxides in particular forming strong elastic compositions of greater clarity than zinc oxide.

Although the invention has been illustrated by the foregoing examples, it is understood that the invention is not limited thereto and that numerous variations and modifications which will be obvious to those skilled in the art are within the spirit and scope of the invention as defined by the appended claims.

I claim:
1. The method which comprises reacting 100 parts by weight of a plastic synthetic rubbery material comprising a polymer of an open-chain aliphatic conjugated diene with an amount of a carboxylating agent chemically equivalent to 1 to 3 times the carboxyl content in the presence of 0.5 to 10 parts by weight of a peroxygen compound so as to introduce into said rubbery material from 0.001 to 0.30 chemical equivalents of combined —COOH per 100 parts by weight of rubber, admixing the resultant plastic, carboxyl-containing rubbery material with an amount of a polyvalent metal oxide chemically equivalent to at least one-half said combined —COOH and forming an intimate mixture thereof, and heating the resultant plastic composition at a temperature of from 125 to 400° F. until said plastic composition has been converted to an essentially elastic, polymeric metallo-carboxylate by a salt formation occurring between the metallic cation of said polyvalent metal oxide and the combined carboxyl groups of the plastic rubbery material.

2. The method which comprises reacting 100 parts by weight of a plastic synthetic rubbery material comprising a polymer of a butadiene-1,3 hydrocarbon with an amount of a carboxylating agent chemically equivalent to 1 to 3 times the carboxyl content in the presence of 0.5 to 10 parts by weight of a peroxygen compound so as to introduce into said rubbery material from 0.001 to 0.30 chemical equivalent of combined —COOH per 100 parts by weight of rubbery material, admixing the resultant plastic, carboxyl-containing rubbery material with an amount of a polyvalent metal oxide chemically equivalent to at least one-half said combined —COOH and forming an intimate plastic mixture thereof, and heating the resultant plastic composition at a temperature of from 125 to 400° F. until said plastic composition is converted to an essentially elastic, polymeric metallo-carboxylate by a salt formation occurring between the metallic cation of the polyvalent metal oxide and the combined carboxyl groups of the rubbery material.

3. The method which comprises reacting 100 parts by weight of a plastic synthetic rubbery material comprising a polymer obtained from the polymerization of a monomeric mixture comprising a predominant proportion of a butadiene-1,3 hydrocarbon with an amount of maleic anhydride chemically equivalent to 1 to 3 times the carboxyl content in the presence of 0.5 to 10 parts by weight of a peroxygen compound and at a temperature of from 25 to 150° C. so as to introduce into said rubbery material from 0.001 to 0.30 chemical equivalent by weight of combined —COOH per 100 parts by weight of rubbery material, admixing the resultant plastic, carboxyl-containing rubbery material with an amount of a polyvalent metal oxide chemically equivalent to at least one-half said combined —COOH and forming an intimate plastic mixture thereof, and heating the resultant plastic composition at a temperature of from 125 to 400° F. until said plastic composition is converted to an elastic polymeric metallo-carboxylate.

4. The method which comprises reacting 100 parts by weight of a plastic synthetic rubbery material comprising a polymer obtained from the polymerization of a monomeric mixture comprising predominantly a butadiene-1,3 hydrocarbon with an amount of a mercapto-substituted carboxylic acid chemically equivalent to 1 to 3 times the carboxyl content in the presence of 0.5 to 10 parts by weight of a peroxygen compound and at a temperature of from 25 to 150° C. so as to introduce into said rubbery material from 0.001 to 0.30 chemical equivalent of combined —COOH per 100 parts by weight of rubber, admixing the resultant plastic, carboxyl-containing rubbery material with an amount of a polyvalent metal oxide chemically equivalent to at least one-half said combined —COOH and forming an intimate plastic mixture thereof, and heating the resultant plastic composition at a temperature of from 125 to 400° F. until said plastic composition is converted to an essentially elastic, polymeric metallo-carboxylate by a salt formation occurring between the metallic cation of the polyvalent metallic oxide and the combined carboxyl groups of the rubbery material.

5. The method which comprises dissolving in a solvent therefor 100 parts by weight of a plastic, olefinically-poly-unsaturated rubbery material comprising polymerized butadiene-1,3, adding 2 to 40 parts by weight of a carboxylating agent and 1 to 10 parts by weight of a peroxygen compound to said solution, heating said solution at a temperature of from 25 to 150° C. so as to introduce into said rubbery material from 0.01 to 0.20 chemical equivalents by weight of combined —COOH per 100 parts by weight of rubber, admixing the resultant plastic, carboxyl-containing rubbery material with an amount of a polyvalent metal oxide chemically equivalent to at least one-half said combined —COOH and forming an intimate plastic composition thereof, and heating the resulting plastic composition at a temperature of from 125 to 400° F. until the plastic composition is converted to an elastic polymeric metallo-carboxylate.

6. The method which comprises dissolving in a solvent therefor 100 parts by weight of a plastic rubbery interpolymer derived from the polymerization in aqueous emulsion of a monomeric mixture comprising a major proportion of butadiene-1,3 and minor proportions of at least one copolymerizable monoolefinic material, adding 2 to 40 parts by weight of a mercapto-substituted carboxylic acid and 1 to 10 parts by weight of a peroxygen compound to said solution, heating said solution at a temperature of from 25 to 150° C. so as to introduce into said rubbery interpolymer from 0.01 to 0.20 chemical equivalents by weight of combined —COOH per 100 parts by weight of rubbery interpolymer, admixing the resulting plastic, carboxyl-containing rubbery interpolymer with an amount of a polyvalent metal oxide at least equivalent to said combined —COOH and forming an intimate plastic mixture thereof, and heating the resultant plastic composition at a temperature of from 125 to 400° F. until said plastic composition is converted to an elastic, polymeric metallo-carboxylate by a salt formation occurring between the metallic cation of the polyvalent metal oxide and the combined carboxyl groups of the rubbery interpolymer.

7. The method which comprises masticating 100 parts by weight of a plastic, polymer of a butadiene-1,3 hydrocarbon with an amount of a mercapto-substituted carboxylic acid chemically equivalent to 1 to 3 times the carboxyl content in the presence of 0.5 to 10 parts by weight of an organic peroxide so as to introduce into said plastic polymer from 0.001 to 0.30 chemical equivalents by weight of combined —COOH per 100 parts by weight of polymer, admixing the resulting plastic, carboxyl-containing polymer with an amount of a polyvalent metal oxide chemically equivalent to at least one-half said combined —COOH and heating the resulting plastic composition at a temperature of from 125 to 400° F. until said plastic composition is converted to an elastic polymeric metallo-carboxylate.

8. The method which comprises masticating 100 parts by weight of a plastic, rubbery polybutadiene-1,3 synthetic rubber with 2 to 40 parts by weight of a mercapto-substituted carboxylic acid in the presence of 1 to 10 parts by weight of an organic peroxide so as to introduce into said polybutadiene from 0.01 to 0.20 chemical equivalents by weight of combined —COOH per 100 parts by weight of polybutadiene, admixing the resulting carboxyl-containing polybutadiene with an amount of a polyvalent metal oxide at least equivalent chemically to said combined —COOH and heating the resulting plastic composition at a temperature of from 150 to 350° F. until said plastic composition is converted to an elastic polymeric metallo-carboxylate.

9. The method which comprises masticating 100 parts by weight of a plastic, butadiene-1,3 styrene interpolymer containing a major proportion of interpolymerized butadiene-1,3 with 2 to 40 parts by weight of a mercapto-substituted carboxylic acid in the presence of 1 to 10 parts by weight of an organic peroxide so as to introduce into said plastic interpolymer from 0.01 to 0.20 chemical equivalents by weight of combined —COOH per 100 parts by weight of plastic interpolymer, admixing said carboxyl-containing interpolymer with an amount of a polyvalent metal oxide at least equivalent chemically to said combined —COOH and heating the resulting plastic composition at a temperature of from 150 to 350° F. until the plastic composition has been converted to an elastic polymeric metallo-carboxylate.

10. The method which comprises masticating 100 parts by weight of a plastic, butadiene-1,3 acrylonitrile interpolymer containing a major proportion of interpolymerized butadiene-1,3 with 2 to 40 parts by weight of a mercapto-substituted carboxylic acid in the presence of 1 to 10 parts by weight of an organic peroxide so as to introduce into said interpolymer from 0.01 to 0.20 chemical equivalents by weight of combined —COOH per 100 parts by weight of plastic interpolymer, admixing the resulting plastic carboxyl-containing interpolymer with an amount of a polyvalent metal oxide at least equivalent chemically to said combined —COOH and heating the resulting plastic mixture at a temperature of from 150 to 350° F. until the plastic carboxyl-containing interpolymer has been converted to an elastic, polymeric metallo-carboxylate.

11. The method of claim 7 in which the mercapto-substituted carboxylic acid is beta-mercapto propionic acid and the polyvalent metallic oxide is zinc oxide.

12. The method of claim 8 in which the mercapto-substituted carboxylic acid is beta-mercapto propionic acid and the polyvalent metallic oxide is zinc oxide.

13. The method of claim 9 in which the mercapto-substituted carboxylic acid is beta-mercapto propionic acid and the polyvalent metallic oxide is zinc oxide.

14. An elastic polymeric metallo-carboxylate produced by the method of claim 1.

HAROLD P. BROWN.

References Cited in the file of this patent

UNITED STATES PATENTS

| Number | Name | Date |
|---|---|---|
| 2,449,418 | Sharkey | Sept. 14, 1948 |
| 2,470,545 | Blake | May 17, 1949 |
| 2,589,151 | Sernink | Mar. 11, 1952 |

FOREIGN PATENTS

| Number | Country | Date |
|---|---|---|
| 602,843 | Great Britain | June 3, 1948 |